United States Patent Office 2,859,096
Patented Nov. 4, 1958

2,859,096

PROCESS FOR PRODUCTION OF URANIUM HEXAFLUORIDE

Robert Dudley Fowler, Baltimore, Md., assignor to the United States of America as represented by the United States Atomic Energy Commission No Drawing. Application February 24, 1947
Serial No. 730,556

7 Claims. (Cl. 23—14.5)

This invention relates to a process for the production of metal fluorides and more particularly to a process for the production of uranium hexafluoride ($UF_6$) from the oxides of uranium.

Uranium dioxide ($UO_2$) may be converted directly into uranium tetrafluoride ($UF_4$) by treatment with dry hydrogen fluoride according to the reaction equation:

$$UO_2 + 4HF = UF_4 + 2H_2O$$

However, neither the treatment of $UO_2$ nor the treatment of the higher oxides of uranium such as uranium trioxide ($UO_3$) and uranium tritaoctoxide ($U_3O_8$) with HF will yield $UF_6$. Moreover, such treatment of $UO_3$ and $U_3O_8$ instead of producing $UF_4$ tends to produce the oxyfluorides.

An object of the present invention therefore is to provide simple and economical methods for the production of $UF_6$. The essence of the invention is the conversion of uranium oxides to $UF_6$ by the action of elemental carbon and a fluorinating agent such as elemental fluorine or cobaltic fluoride ($CoF_3$).

One method for the production of $UF_6$ is by the action of elemental fluorine on $UF_4$. However, $UF_4$ is not a commercially available material, and I have therefore aimed to provide a process which is applicable to the readily available oxides of uranium, such as $UO_2$, $UO_3$, and $U_3O_8$. In accordance with the invention these oxides of uranium may be reduced with carbon and simultaneously reacted with a fluorinating agent to convert them to uranium hexafluoride.

A process in accordance with the invention is as follows:

Finely divided carbon such as sugar carbon or charcoal or Norit is mixed with finely divided $U_3O_8$ using a proportion of the carbon to the oxide about 50% in excess of that theoretically required (according to the reaction $U_3O_8 + 4C + 9F_2 = 3UF_6 + 4CO_2$) to combine with all of the oxygen as $CO_2$. The mixture is placed in a copper boat or tray in a copper or nickel oven and heated to from 400° C. to 500° C., e. g. by wrapping the oven with electrical resistance heating elements. Fluorine gas free of HF, $O_2$ and $H_2O$ is passed into the oven and the gas leaving the oven is run through a trap or condenser cooled to —70° C. to collect the $UF_6$ formed. The yield of $UF_6$ based upon the uranium content of the oxide used is from 95 to 100%, and the utilization of the fluorine gas supplied to the reaction chamber is highly efficient if the rate of flow of the gas compared to the exposed surface of the mixture of the uranium oxide and carbon is not excessive. For instance the rate of supply of fluorine gas may be about 100 cc. per minute for a charge of about 3 kilograms of the oxide spread in a layer about one-half inch deep.

In the above described process any of the oxides of uranium i. e., $U_3O_8$, $UO_2$ or $UO_3$ or mixtures thereof may be employed. This process has the advantage that uranium oxide is reduced and converted into uranium hexafluoride in a single operation.

In a variation of this process cobaltic fluoride ($CoF_3$) may be substituted for elemental fluorine as the fluorinating agent by simply mixing the uranium oxide, the carbon and the $CoF_3$ together and heating the mixture at 300° to 500° C. The reaction proceeds in accordance with the following equation when $U_3O_8$ is being converted to $UF_6$:

$$U_3O_8 + 4C + 18CoF_3 = 3UF_6 + 4CO_2 + 18CoF_2$$

The $UF_6$ thus produced is run through a trap or condenser cooled to —70° C. to collect the $UF_6$ formed.

The $CoF_3$ for this process may be made by treating $CoF_2$ with elemental fluorine, e. g., by placing the $CoF_2$ in a copper boat in a copper reaction chamber, heating to about 200° C. and passing fluorine gas into the chamber. An advantage of this process is that the fluorine gas, produced for instance by the electrolysis of an acid fluoride or a mixture or a combination of an alkali metal fluoride and hydrofluoric acid, need not be purified with respect to HF before it is used. Another advantage of the above procedure is that after heating the mixture of uranium oxide, carbon and $CoF_3$ and expelling the $UF_6$, the residue of $CoF_2$ may be treated with fluorine, as described above, to reconvert it into $CoF_3$ and the latter used again in a repetition of the process.

Other metal fluorides, such as silver difluoride ($AgF_2$), bismuth pentafluoride ($BiF_5$), and ceric fluoride ($CeF_4$), may be substituted for the $CoF_3$ in the above process, but practically, so far as I have tested them, $CoF_3$ is the most satisfactory.

This application is a continuation-in-part of my co-pending application, Serial No. 475,851, filed February 13, 1943, now Patent No. 2,810,626.

As many embodiments may be made of this inventive concept and as many modifications may be made in the embodiments hereinbefore set forth, it is to be understood that all matter described herein is to be interpreted merely as illustrative and limited only by the scope of the appended claims.

I claim:

1. Process for the production of uranium hexafluoride which comprises contacting an oxide of uranium simultaneously with elemental carbon and elemental fluorine at 400° C. to 500° C., and recovering the uranium hexafluoride thereby produced.

2. Process as defined in claim 1 in which the oxide of uranium is $U_3O_8$.

3. Process as defined in claim 1 in which fluorine gas is contacted with an intimate mixture of the uranium oxide and carbon.

4. Method for the production of uranium hexafluoride which comprises simultaneously heating at 300° C. to 500° C. a mixture of an oxide of uranium and elemental carbon in the presence of a fluorinating agent selected from the group consisting of elemetnal fluorine, cobaltic fluoride, silver difluoride, bismuth pentafluoride, and ceric fluoride, and recovering the uranium hexafluoride thereby produced.

5. Method for the production of uranium hexafluoride which comprises reducing an oxide of uranium with elemental carbon and simultaneously reacting it at 300° C. to 500° C. with a fluorinating agent selected from the group consisting of elemental fluorine, cobaltic fluoride, silver difluoride, bismuth pentafluoride, and ceric fluoride, and recovering the uranium hexafluoride thereby produced.

6. A process for producing $UF_6$ from $U_3O_8$ which comprises heating a mixture of $U_3O_8$ and carbon to from 400° to 500° C. while passing fluorine gas over said mixture, and recovering the uranium hexafluoride thereby produced.

7. A process for producing $UF_6$ from $U_3O_8$ which comprises heating a mixture of $U_3O_8$, carbon and $CoF_3$ at 300° to 500° C. and recovering the uranium hexafluoride thereby produced.

References Cited in the file of this patent

Mellor: Treatise on Inorganic and Theoretical Chemistry, pp. 74, 75, vol. 12.

Mellor: Treatise on Inorganic and Theoretical Chemistry, vol. 5, pp. 890, 891.

Katz et al.: The Chemistry of Uranium, pp. 399, 447, 448 (1951); publ. by McGraw-Hill Book Co., New York, N. Y.